(12) United States Patent
Di Federico et al.

(10) Patent No.: US 7,732,551 B2
(45) Date of Patent: Jun. 8, 2010

(54) POST-TREATMENT FOR POLYMER PELLETS

(75) Inventors: Pier Luigi Di Federico, Ferrara (IT); Carlo Ciccarone, Kennett Square, PA (US); Luciano Michielin, Virgilio (IT); Giuseppe Penzo, Montanara di Curtatone (IT)

(73) Assignee: Basell Poliolefine Italia s.r.l., Milan (IT)

( * ) Notice: Subject to any disclaimer, the term of this patent is extended or adjusted under 35 U.S.C. 154(b) by 1015 days.

(21) Appl. No.: 10/559,259

(22) PCT Filed: May 27, 2004

(86) PCT No.: PCT/EP2004/005748

§ 371 (c)(1),
(2), (4) Date: Dec. 1, 2005

(87) PCT Pub. No.: WO2004/111111

PCT Pub. Date: Dec. 23, 2004

(65) Prior Publication Data

US 2006/0279019 A1   Dec. 14, 2006

Related U.S. Application Data

(60) Provisional application No. 60/483,757, filed on Jun. 30, 2003.

(30) Foreign Application Priority Data

Jun. 12, 2003 (EP) .................................. 03101725

(51) Int. Cl.
  C08F 210/00   (2006.01)
  D01D 5/40    (2006.01)
  B28B 11/00    (2006.01)
  B29C 71/00    (2006.01)

(52) U.S. Cl. ................. 526/348; 264/140; 264/232; 264/237

(58) Field of Classification Search ................. 526/348; 264/140, 232, 237
See application file for complete search history.

(56) References Cited

U.S. PATENT DOCUMENTS

| 3,544,525 | A | * | 12/1970 | Balint et al. ................. 528/483 |
| 4,359,544 | A |   | 11/1982 | Hwo et al. ................... 524/232 |
| 4,606,873 | A |   | 8/1986  | Biglione et al. ............... 264/53 |
| 5,206,292 | A |   | 4/1993  | Hwo et al. ................... 525/240 |
| 5,623,012 | A |   | 4/1997  | Hwo ........................... 524/398 |
| 2003/0096699 | A1 | | 5/2003 | Arletti et al. ................. 202/172 |

FOREIGN PATENT DOCUMENTS

| FR | 2632563   | 12/1989 |
| JP | 55137928  | 10/1980 |
| WO | 9101207   | 2/1991  |
| WO | 2004000891 | 12/2003 |
| WO | 2004000895 | 12/2003 |

* cited by examiner

Primary Examiner—William K Cheung
(74) Attorney, Agent, or Firm—William R. Reid

(57) ABSTRACT

A continuous process for minimizing the agglomeration of freshly manufactured polyolefin pellets comprising the steps of:
  feeding an aqueous stream containing polyolefin pellets to a tower,
  cooling said polyolefin pellets during their upward flow along said tower by means of a downward flow of a cooling agent having a density higher than said polyolefin,
  collecting the cooled pellets from the top of said tower after a residence time in the tower comprised between 2 and 20 minutes.

23 Claims, 1 Drawing Sheet

POST-TREATMENT FOR POLYMER PELLETS

This application is the U.S. national phase of International Application PCT/EP2004/005748, filed May 27, 2004, claiming priority to European Patent Application 03101725.4 filed Jun. 12, 2003, and the benefit under 35 U.S.C. 119(e) of U.S. Provisional Application No. 60/483,757, filed Jun. 30, 2003; the disclosures of International Application PCT/EP2004/005748, European Patent Application 03101725.4 and U.S. Provisional Application No. 60/483,757, each as filed, are incorporated herein by reference.

The present invention relates to a process for treating polymer pellets to reduce their tendency to agglomeration.

In particular, the present invention relates to a process for minimizing the tackiness of polymer pellets coming from the polymerization of olefins and successive pelletization of the obtained polymers.

It is known that most of the plastic resin sold in the market today is in the form of pellets. Plastic resins are sold in the form of pellets to improve transportation, handling, safety and end-user processability characteristics. Granular polymer discharged from the polymerization reactor is thus melted and extruded and made to flow through dies before being cut into pellets. The extrusion process also serves as a step for the addition of performance additives for the required stability and material properties. The size, shape and uniformity of the pellets are important characteristics to be met during the polymer production. The pelletizing step is also important from the operational standpoint. Any malfunction of the pelletizer can result in process shutdown and manufacturing halt with serious financial consequences, especially for large extrusion lines. As a consequence, the pelletization step is recognized to be an important step in the production line of any polyolefin production plant.

An efficient and satisfying pelletization of some polyolefins has been difficult to achieve. The difficulties have been particularly observed with high melt flow polyolefins, and are emphasized by the tendency of the polymer product to agglomerate. Although this agglomeration generally occurs after the pelletization of polyolefinic homopolymers and/or copolymers, it appears to be more severe in the case of copolymers. This is because the copolymers generally have a slower crystallization rate and a lower crystallinity than the homopolymers. For instance, copolymers of butene-1, especially butene-1/ethylene copolymers, show extreme tendency to tackiness during the pelletization, caused by the slow crystallization rate or solidification rate of these copolymers. In fact, when the pellets leave the cutting blades they are very clear and tacky, and have a tendency to form agglomerates if they collide with each other. After polymer pellets are formed by means of an underwater face cutter or a strand cutting pelletizer, the pellets are passed to a spin drier in order to minimize the amount of entrained water. Phenomena of sticking and agglomeration of pellets can easily occur along the line connecting the pelletizer bowl to the spin drier. Furthermore, the agglomerates of pellets may plug the pelletizer bowl and the spin drier, so that the extrusion line has to be shut down in order to clean the plugged section, thus resulting in undesirable production interruptions. Also, the high number of pellet marriages shown in the final product is not acceptable in the customers' fabrication process: the adverse consequences of this agglomeration include an unwillingness on the customers' part to buy such a product.

Various attempts have been made to solve or to minimize this problem of undesired pellets agglomeration.

It is known in the art the use of polymeric nucleants to accelerate crystallization, including polyolefinic nucleants such as High density Polyethylene (HDPE) powder. They act as an external pelletizing aid to reduce the occurrence of pellets' agglomeration. Polyolefinic powder nucleants typically have density less than water and thus float on the surface of the water-bath or tank where the polymer pellets are treated. The floating causes an overflow of the polyolefinic powder from the water-bath or tank, which can result in processing disruptions requiring the occasional cleaning up of equipment and work environment. The success of this method is strongly dependent on the good dispersion of the polyolefinic powder in the water tank containing the polymer pellets. Therefore, a vigorous stirring is generally required to obtain the effective benefit of the polyolefinic powder as a pelletizing aid. This method of reducing agglomerations is very messy and labor intensive. Even under the best of circumstances, a significant fraction (about 20%) of the polymer production has to be discarded due to poor pellet quality and pellet agglomeration. The use of organometallic surfactants to minimize the pellet agglomeration problem is also known in the art. However, when these surfactants are used at the effective level, it often results in severe foaming problems, and the foam may overflow from the water tank to the floor and thereby cause messy operation and unsafe working conditions. The combination of a defoamer, such as FOAMTROL® and an organometallic surfactant such as zinc stearate has been used with some success. This combination has the drawback of the potential carcinogenic nature of FOAMTROL®. U.S. Pat. No. 4,359,544 proposes the use of a nucleating agent package as pelletizing aid, which package is a mixture of HDPE and stearamide. However, both HDPE and stearamide do not disperse well in water, and thus do not work well in a water bath as pelletizing aids.

U.S. Pat. No. 5,206,292 proposes the use of oxidized high-density polyethylene powder to minimize the agglomeration of freshly manufactured polyolefin pellets. According to the working examples of this patent, the pellets are fed to a translucent mixing tank containing water and small amounts of oxidized HDPE. The slurry is maintained in agitation using an air activated stirrer. This technique has many drawbacks. First, oxidized HDPE is not approved by the FDA for applications involving direct food contact. Moreover long stirring times, of about 30 minutes, are required to achieve a good dispersion of oxidized HDPE in the cooling agent containing the polymer pellets. Also, in the regions far from the stirrer some pellets can easily stick to each other before crystallization is completed.

U.S. Pat. No. 5,623,012 relates to a method for reducing the tackiness of freshly manufactured polyolefin pellets. The method involves the addition of a mixture containing a polymeric nucleant and a metallic fatty acid surfactant to a cooling agent. Zinc stearate as an organic metallic surfactant, and HDPE powder as a polymeric nucleant are added to the cooling agent. Water is preferably used as the cooling agent. The obtained slurry along with the polymer pellets are pumped into a metal crystallization tank. An agitator is used to stir the water in the tank in order to disperse more uniformly the HDPE powder and the metallic surfactant. According to the disclosure of this patent a synergistic effect is obtained by using a HDPE powder and a metallic surfactant so that both the pellets agglomeration and foaming are reduced. However, the technique of treating polymer pellets as described in this patent is very chaotic and messy. Having a density lower than water, HDPE powder tends to float on the water: in order to ensure an acceptable dispersion of said powder into the entire volume of the crystallization tank, a continuous and intensive stirring must be provided. Due to this stirring, the movement of the pellets inside the crystallization tank is very random so that a part of them reach the outlet of the tank much before the remaining pellets: different residence times are involved in running the crystallization tank. In the regions where a good dispersion of HDPE powder is not achieved, some pellets can easily stick to each other before the completion of crystallization, while other pellets can leave the crystallization tank without being sufficiently cooled and hardened, thus giving rise to sticking problems in the successive steps of the process.

In view of the above drawbacks, it would be desirable to provide a process for efficiently cooling polymer pellets to prevent or minimize their agglomeration in equipment downstream of the pelletization step.

It has now been surprisingly found a process for treating in a continuous manner polymer pellets, capable of providing an efficient and homogeneous cooling of large amounts of polymer pellets, thus strongly reducing their tendency to agglomeration. It is therefore an object of the present invention a continuous process for minimizing the agglomeration of freshly manufactured polyolefin pellets comprising the steps of:

(a) feeding an aqueous stream containing polyolefin pellets to a tower,
(b) cooling said polyolefin pellets during their upward flow along said tower by means of a descending flow of a cooling agent having a density higher than said polyolefin,
(c) collecting the cooled pellets from the top of said tower after a residence time in the tower comprised between 2 and 20 minutes.

Figure 1:
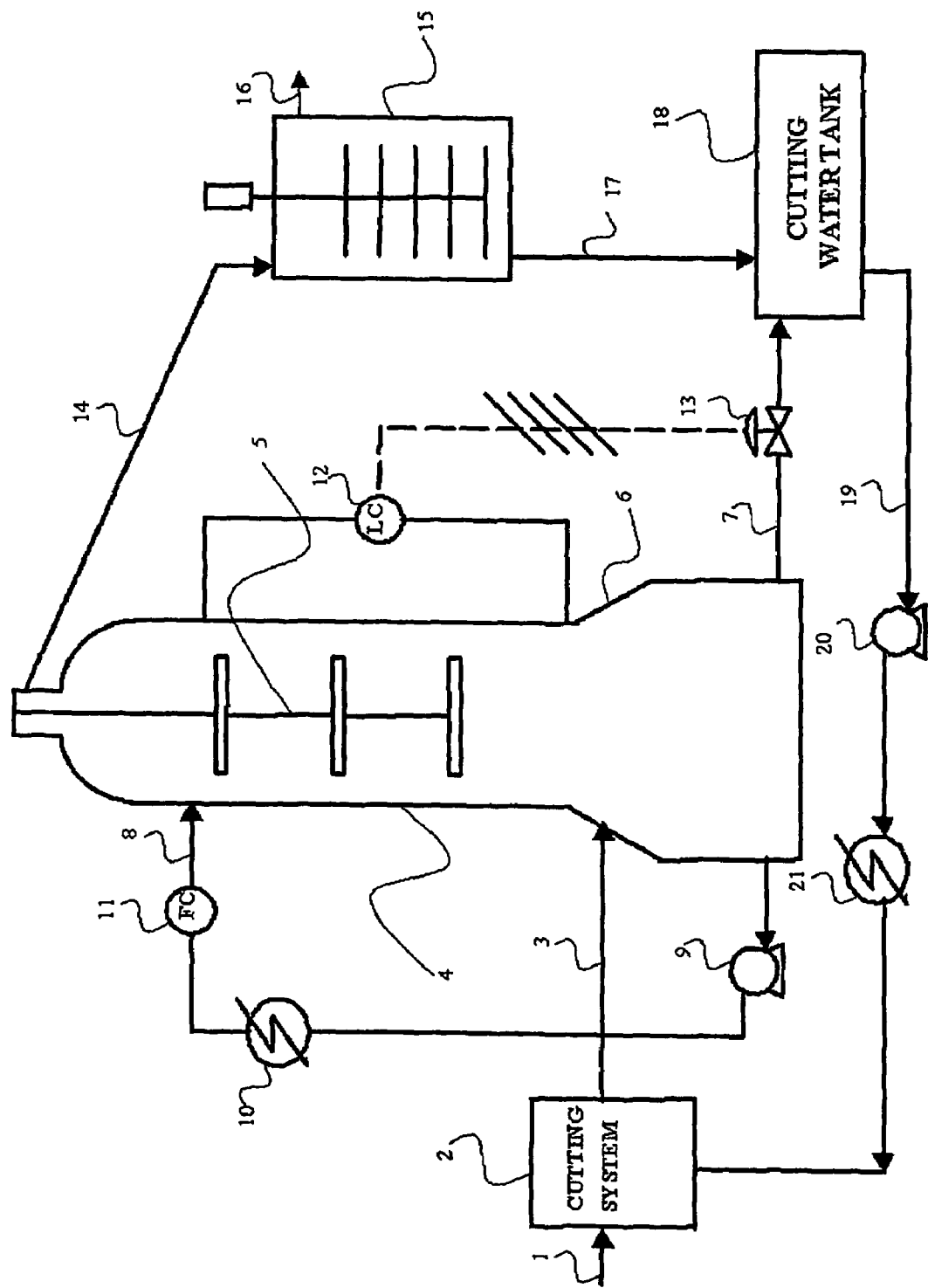
FIG. 1 is a process flow diagram of a process for minimizing the agglomeration of freshly manufactured polyolefin pellets.

Throughout the present specification the residence time of the pellets inside the tower is defined as the ratio between the "hold-up" of polymer pellets inside the tower and the mass flow rate of polymer discharged from the tower.

The process of the present invention is particularly efficient in causing a significant reduction of the tackiness of polymer pellets obtained from an underwater pelletization step. During the treatment in continuous according to the present invention, the surface of each pellet is efficiently cooled and hardened, at the same time minimizing the surface contact between them. As a consequence, sticking problems are prevented along the line connecting the pelletizer to the drying step where the removal of water from the polymer is carried out.

The polymer discharged from the polymerization reactor is first subjected to extrusion to obtain polymer strands, which are passed to a cutting mechanism where they are cut into pellets. The underwater pelletization can be carried out according to any conventional technique in order to obtain an aqueous stream containing polyolefin pellets. An underwater face cutter or a strand cutting pelletizer can be used to this aim.

According to the present invention, an aqueous stream containing polyolefin pellets in a weight ratio $H_2O$/pellets in the range from 40 to 70 is obtained from the pelletization step and is fed to the bottom part of a tower (step a). The temperature of the aqueous stream entering the tower is generally in the range from 30 to 60° C.

The cooling agent as used in the process of the present invention can be water or any alternative coolant having a density higher than the density of the treated pellets. Preferably, the density of said coolants should be higher than 950 $kg/m^3$.

Water is preferably used as the cooling agent in the process of the present invention and hereinafter water will be referred to as the cooling agent. Accordingly, an aqueous stream containing the cooled pellets is collected from the top of the tower in step (c). The discharge of said aqueous stream does not require the use of any pumping device, but it is advantageously carried out overflowing the pellets from the top of the tower.

The tower used in the present invention is a vertical tower equipped with a stirrer along the axes thereof. Preferably, the aqueous stream containing polyolefin pellets of step (a) is introduced into the tower along a direction tangential to the tower walls. This tangential inlet helps to promote the separation between the polymer pellets and the water, due to the involved "centrifugal effect". However, said separation is mostly caused by the tendency of the polymer to float on the water. In fact, once introduced into the tower, the components of the entering stream show a different behaviour: due to the lower density of the polymer with respect to water, the pellets flow upwardly along the axes of the tower. On the contrary, a major part of the water entering the tower via step (a) flows downwards and is discharged from an outlet placed at the bottom of the tower. As a consequence, said major part of water enters the tower without running up along it.

Flowing upwardly along the tower, the pellets meet in countercurrent a descending flow of cooling water (step b), which favours the crystallization of their surface. During their crystallization the polymer pellets become hard and lose their tackiness. The higher the residence time of the pellets inside the tower, the higher the level of crystallization, thus preventing the agglomeration of the pellets. The residence time required for an acceptable crystallization depends on the particular type of polyolefin treated according to the present invention. Polyolefin copolymers typically exhibit slower crystallization rates than homopolymers; therefore the residence times for copolymers should generally be higher than 5 minutes. For homopolymer pellets, the residence time may be lower than 5 minutes. As a consequence, the required residence time is strictly dependent on the type of polymer, however a preferred range suitable for many cases is from 5 to 12 minutes.

The cooling water is fed at the top of the tower at a temperature between 10 and 40° C., runs downwards along the tower and, together with the major part of the cutting water coming from step a), is discharged from an outlet placed at the bottom of the tower. Besides cooling the polymer pellets, the downward flow of water causes an "expansion" of the pellets/water slurry inside the tower: said expansion also contributes to the prevention of pellets agglomeration. It has been observed that the pellets/water slurry has a behaviour similar to a fluidized bed of polymer particles with the difference that the fluidization is caused by the counter-current flow of cooling water. The higher the downward velocity of the cooling water, the higher the degree of bed expansion: as a consequence, the downward velocity of the cooling water is a parameter affecting the correct working of the process. It is important to keep said parameter constant during the operation of the tower. In general, if the downward velocity of the cooling water is too low, a sufficient expansion of the pellets/water slurry is not achieved and the pellets agglomeration is not successfully hindered. On the contrary, if said downward velocity is too high, the pellets/water slurry is excessively expanded downwardly, thus discharging part of the pellets from the outlet placed at the bottom of the tower. It has been found that in order to avoid the above drawbacks, a suitable range for the downward velocity of the cooling water is from 0.5 to 4 cm/s, preferably from 1.5 to 3.0 cm/s. Under the value of 0.5 cm/sec, a sufficient expansion of the pellets is only partially achieved, thus the pellets agglomeration is not successfully prevented. On the contrary, above 4 cm/s the expansion of the pellets is such that some pellets may be discharged from the outlet placed at the bottom of the tower.

An additional feature of the tower used in the present invention is an agitator placed in the top, narrow section: said agitator provides the slurry of pellets with a gentle mixing action, which contributes to the prevention of agglomeration, keeping the pellets separated from each others. The stirring velocity should generally not exceed 100 rpm, preferably should be comprised in the range of 15 to 40 rpm. Strong and vigorous stirring should be avoided because it would disturb the "plug flow" characteristic of the pellets along the tower, and would cause an uneven residence time distribution of the pellets. In fact, a remarkable advantage of the process of the invention is related to the fact that the upward flow of polymer pellets along the tower is essentially in a "plug flow" mode: this implies a homogeneous cooling of all the pellets introduced into the tower. This is a relevant difference with respect to the conventional techniques known in the art, where the polymer pellets are cooled by means of chaotic and messy systems as explained in the background of the present invention.

When the polymer pellets reach the top of the tower, they overflow from the tower. However, since the major part of the water entering the tower is discharged from the outlet placed near the bottom of the tower, only a minor amount of water will reach the top of the tower together with the pellets. As a consequence, while the aqueous stream of step (a) has a weight ratio $H_2O$/pellets from 40 to 70, an aqueous stream containing polyolefin pellets in a weight ratio $H_2O$/pellets from 3 to 10 overflows from the top of the tower (step c). This means a decreased amount of water caused to flow to the drying step. This is another remarkable advantage of the process of the invention: differently from the prior art processes where the pellets together with a large amount of water flow to the drying apparatus, the process of the invention reduces the cost of the successive drying step significantly. In fact the size and operating costs of the drying apparatus can be minimized. The drying step is preferably carried out in a centrifugal drier.

The water discharged from the bottom of the tower can conveniently by-pass the drying step and is continuously cooled and recycled to the underwater pelletization together with the water which is separated from the pellets in the centrifugal drier. The process of the present invention will now be described in details with reference to the enclosed Figure, which is illustrative and non-limitative of the scope of the invention.

With reference to FIG. 1, the polymer particles coming from a polymerization reactor and from an extrusion line (not shown) are fed via line 1 to a cutting system 2, where underwater pelletization is carried out. An aqueous stream containing polyolefin pellets is discharged from the cutting system 2 and is fed via line 3 to the tower 4, which is a vertical tower equipped with a stirrer 5 along the axes thereof. The stirrer 5 is placed in the upper part of the tower 4, pin paddles are preferably used to cause a gentle mixing action inside the upper part of the tower.

Preferably the tower used in the present invention is designed with a different diameter between the bottom part and the upper part, so that it comprises an upper, narrower part and a bottom, broader part. A suitable range for the diameter of the upper part is from 0.1 to 0.5 $D_B$, preferably from 0.2 to 0.4 $D_B$, where $D_B$ is the diameter of the bottom part. As a consequence, the body of the tower is provided with a transition 6 connecting the upper part to the bottom part of the tower.

The aqueous stream of step a) can be fed to the bottom part of the tower or, in alternative, it can be fed to the tower 4 in correspondence of said transition 6. The aqueous stream containing polyolefin pellets is introduced into the tower 4 via line 3 along a direction preferably tangential to the walls of said transition 6. Once introduced into the tower 4, due to the lower density of the polymer with respect to water, the pellets flow upwardly along the upper, narrower part of the tower 4. On the contrary, a major part of the water entering the tower via line 3 flows downward along the bottom part of the tower and is discharged via line 7.

Flowing upwardly along the tower 4, the pellets meet in countercurrent a descending flow of cooling water, which causes the crystallization of their surface. During their crystallization the polymer pellets become hard and lose their tackiness. The cooling water is fed via line 8 to the top of the tower 4, runs downwards along the tower and is continuously recycled to the top of the tower passing through a pump 9 and a cooling means 10. Being cooled to a temperature in a range of 10-40° C., line 8 does not require the use of a refrigerating system, since the desired level of cooling can be achieved by a simple heat exchange with water at ambient temperature, normally available at any plant site. Said process feature implies a considerable advantage in term of power consumption and investment cost: on the contrary the prior art processes, in which the polymer pellets are contacted with water inside big tanks, require a refrigerating system to drastically cool the water to temperatures of about 0-10° C.

The degree of "expansion" of the pellets inside the tower is controlled by means of a Flow Controller (FC) 11 placed on line 8: the downward velocity of the cooling water is thus controlled in order to obtain the desired degree of "expansion" of the polymer bed inside the top, narrow part of the tower. The control of said degree of "expansion" of the polymer pellets inside the tower can be visually made via sight glasses installed at different heights along the narrower part of the tower.

The hold-up of polymer pellets inside the tower 4 is measured and adjusted by means of the Level Controller (LC) 12 via a differential pressure cell. By exploiting the difference in density between polymer and water and by comparing the weight of the column containing pellets and water with the weight of the same column containing only water, the LC 12 measures the hold-up of polymer inside the tower. Acting on the opening of a control valve 13 placed on line 7, the LC 12 can adjust the flow of water discharged from the tower 4, thus maintaining the polymer hold-up inside the tower at the required value. As a consequence, depending on the type of polymer to be treated, the tower can be operated at the suitable residence time, which is kept constant during the treatment.

When the polymer pellets reach the top of the tower 4, they overflow from the tower via line 14. However, since the major part of the water entering the tower via line 3 is discharged via line 7, the amount of water reaching the top of the tower together with the pellets is drastically reduced, thus minimizing the size of the equipment and costs necessary for drying the pellets. Said minor part of water and the polymer pellets are fed to the centrifugal drier 15 via line 14.

Dried polymer pellets are discharged from the centrifugal drier 15 via line 16 while the water is separated and collected at the bottom of the centrifugal drier 15 before being transferred via line 17 to the cutting water tank 18. Also, the water discharged from the bottom of the tower via line 7 flows to the cutting water tank 18. From the cutting water tank 18 a suitable amount of water is continuously fed to a pump 20 via line 19, cooled in a cooling means 21 before being recycled to the cutting system 2. The following examples have to be considered representative and non-limiting of the scope of the present invention.

EXAMPLES

In Examples 1-3 a process set-up as described in FIG. 1 is used.

The tower 4 is designed so that the diameter of the upper part is smaller than the diameter of the bottom part. The upper, narrow part of the tower has a diameter of 0.12 m and a height of about 4.0 m, while the bottom part of the tower has a diameter of about 0.4 m and a height of about 0.8 m.

The degree of "expansion" of the pellets inside the tower is controlled by means of a Flow Controller (FC) 11 placed on line 8. The downward velocity of the cooling water is maintained at the value of 2 cm/s to achieve a degree of "expansion" of the polymer pellets of about 56% by vol inside the top, narrow part of the tower 4.

The hold-up of polymer pellets inside the tower 4 is adjusted by means of the Level Controller (LC) 12. Depending on the type of polymer pellets to be treated, a suitable residence time of the pellets inside the tower is selected in examples 1-3.

The residence time $\tau$ of the pellets is the ratio between the polymer hold-up and the amount of polymer discharged from the tower via line 14.

The efficiency of the process of the invention to prevent the tackiness of polymer pellets is visually evaluated checking the level of pellets agglomeration over the line 14 (connecting the tower to the centrifugal drier) and at the outlet from the centrifugal drier (line 15).

Example 1

A butene-1 homopolymer with a melt flow rate MIE of about 20 g/10 min (ASTM D1238, condition 190° C./2,16 kg) is prepared by liquid-phase polymerization of butene-1. The polymerization process as well as the catalyst deactivation are carried out according to the description of Patent Application WO 04/000895 assigned to Basell Poliolefine Italia. The removal of the unreacted butene-1 from the polymeric solution obtained from the polymerization reactor is carried out by melt devolatilization as described in Patent Application WO 04/000891 assigned to Basell Poliolefine Italia.

The polybutene-1 melt withdrawn from the devolatilization step is introduced into a static mixer for mixing the additives required for the compounding of the polymer.

The polymer melt exiting the static mixer is then fed via line 1 into a Werner & Pfleiderer underwater pelletizer 2 where it is cut into pellets.

An aqueous stream containing 50 kg/h of polymer pellets and 2.8 m³/h of water is continuously discharged from the underwater pelletizer 2 at a temperature of about 50° C.: the resulting weight ratio H₂O/pellets is 56. Said stream is then introduced into the tower 4 via line 3.

Approximately 0.814 m³/h of cooling water at a temperature of 30° C. are introduced at the top of the tower via line 8, and are continuously recycled from the bottom to the top of the tower passing through a pump 9 and a cooling means 10. Approximately 2.5 m³/h of water are discharged from the bottom of the tower and are continuously passed via line 7 to the cutting water tank 18, while an aqueous stream containing 50 kg/h of polymer pellets and about 0.3 m³/h of water overflows from the top of the tower via line 14: the weight ratio H₂O/pellets in this line is 6. Said aqueous stream is then fed to the centrifugal drier 14.

The LC 12 maintains the hold-up of polymer inside the tower 4 at a value of about 4.17 kg, so that the residence time $\tau$ of the pellets inside the tower is about 5 minutes ($\tau$=4.17 kg/50 kg/h).

50 kg/h of dried polymer pellets are withdrawn from the centrifugal drier 15 via line 16 and 0.3 m³/h of water are discharged from the bottom of the drier 15 and then transferred via line 17 to the cutting water tank 18.

2.8 m³/h of water from the cutting water tank 18 are continuously recycled to the underwater pelletizer 2 passing through a pump 20 and a cooling means 21.

A negligible level of pellets agglomeration was found over line 14 and at the outlet from the centrifugal drier.

Example 2

The same liquid-phase polymerization process indicated in example 1 is used to prepare a butene-1 copolymer containing 3% by weight of ethylene and having a MIE of about 45 g/10 min.

An aqueous stream containing 50 kg/h of polymer pellets and 2.8 m³/h of water is treated according to the process of the invention. The same operating conditions of example 1 are used with the difference that the polymer hold-up inside the tower 4 is increased to a value of about 8.33 kg, so that the residence time of the pellets inside the tower is about 10 minutes (8.33 kg/50 kg/h).

A negligible level of pellets agglomeration was found along line 14 and at the outlet from the centrifugal drier.

Example 3

50 kg/h of a propylene copolymer containing 50% by weight of ethylene and having a MIE of about 5 g/10 min are treated according to the process of the invention. The same operating conditions of example 1 are used with the difference that the polymer hold-up inside the tower 4 is increased to a value of about 8.33 kg, so that the residence time of the pellets inside the tower is about 10 minutes (8.33 kg/50 kg/h). A negligible level of pellets agglomeration was found over line 14 and at the outlet from the centrifugal drier.

The invention claimed is:

1. A continuous process for minimizing the agglomeration of freshly manufactured polyolefin pellets comprising the steps of:
   (a) feeding an aqueous stream containing polyolefin pellets to a tower having walls and a top, the polyolefin pellets having an upward flow along said tower;
   (b) cooling said polyolefin pellets during their upward flow along said tower by means of a downward flow of a cooling agent having a density higher than said polyolefin, thereby forming cooled pellets; and
   (c) collecting the cooled pellets from the top of said tower after a residence time in the tower between 2 and 20 minutes.

2. The process according to claim 1, wherein the aqueous stream of step (a) is obtained from an underwater pelletization step.

3. The process according to claim 1, wherein the aqueous stream of step (a) contains polyolefin pellets in a weight ratio H₂O/pellets from 40 to 70.

4. The process according to claim 1, wherein the aqueous stream of step (a) has a temperature in the range from 30 to 60° C.

5. The process according to claim 1, wherein said tower is a vertical tower comprising a stirrer along the axes thereof.

6. The process according to claim 5, wherein said tower comprises:
an upper, narrower part, having a diameter;
a bottom, broader part, having a diameter $D_B$; and
a transition connecting the upper part to the bottom part.

7. The process according to claim 6, wherein the diameter of said upper part is from 0.1 to 0.5 $D_B$.

8. The process according to claim 6, wherein the aqueous stream of step (a) is fed to the bottom part of said tower.

9. The process according to claim 6, wherein the aqueous stream of step (a) is fed to said transition connecting the upper part to the bottom part of the tower.

10. The process according to claim 1, wherein the aqueous stream of step (a) is fed to said tower along a direction tangential to the tower walls.

11. The process according to claim 6, wherein a major part of water entering the tower in step a) is discharged from an outlet placed at the bottom of the tower without running up along it.

12. The process according to claim 1, wherein said residence time is between 5 and 12 minutes.

13. The process according to claim 1, further comprising a polymer hold-up inside said tower, wherein the polymer hold-up is measured and adjusted by means of a differential pressure cell.

14. The process according to claim 1, wherein said cooling agent is water.

15. The process according to claim 14, wherein water is fed at the top of said tower at a temperature between 10 and 40° C.

16. The process according to claim 14, wherein water flows downward along said tower at a velocity from 0.5 to 4.0 cm/s.

17. The process according to claim 16, wherein the velocity is 1.0 to 3.0 cm/s.

18. The process according to claim 1, wherein the aqueous stream containing the cooled pellets is collected from the top of the tower in step c).

19. The process according to claim 1, wherein step c) is carried out by overflowing the pellets from the top of the tower.

20. The process according to claim 1, wherein the aqueous stream of step (c) contains polyolefin pellets in a weight ratio $H_2O$/pellets from 3 to 10.

21. The process according to claim 1, wherein the aqueous stream of step (c) is fed to a drying step wherein water is separated from the aqueous stream.

22. The process according to claim 21, wherein the drying step is carried out in a centrifugal drier.

23. The process according to claim 21, wherein the water separated in the drying step is cooled and recycled to an underwater pelletization step.

* * * * *